US011209572B2

(12) United States Patent
Malvesin et al.

(10) Patent No.: US 11,209,572 B2
(45) Date of Patent: Dec. 28, 2021

(54) MESHLESS AND MESH-BASED TECHNIQUE FOR MODELING SUBTERRANEAN VOLUMES

(71) Applicant: Schlumberger Technology Corporation, Sugar Land, TX (US)

(72) Inventors: Emmanuel Malvesin, Montpellier (FR); Frantz Maerten, Pignan (FR); Julien Renaudeau, Montpellier (FR); Arnaud Levannier, Prades-le-Lez (FR)

(73) Assignee: Schlumberger Technology Corporation, Sugar Land, TX (US)

(*) Notice: Subject to any disclaimer, the term of this patent is extended or adjusted under 35 U.S.C. 154(b) by 336 days.

(21) Appl. No.: 16/282,300

(22) Filed: Feb. 22, 2019

(65) Prior Publication Data

US 2019/0265386 A1    Aug. 29, 2019

(30) Foreign Application Priority Data

Feb. 23, 2018   (EP) .................................... 18305187

(51) Int. Cl.
| | | |
|---|---|---|
| G01V 99/00 | (2009.01) | |
| G06F 30/20 | (2020.01) | |
| G06F 111/10 | (2020.01) | |

(52) U.S. Cl.
CPC ............ G01V 99/005 (2013.01); G06F 30/20 (2020.01); *G06F 2111/10* (2020.01)

(58) Field of Classification Search
CPC ........... G01V 99/005; G01V 2210/646; G01V 2210/663; G01V 2210/642;
(Continued)

(56) References Cited

U.S. PATENT DOCUMENTS 10,088,596 B2    10/2018  Maerten
2013/0112407 A1   5/2013  Cheng et al.
(Continued)

OTHER PUBLICATIONS

Calcagno, et al., "Geological modelling from field data and geological knowledge. Part I. Modelling method coupling 3D potential-field interpolation and geological rules," Physics of the Earth and Planetary Interiors, vol. 171, Issue 1-4, pp. 147-157, 2008.
(Continued)

*Primary Examiner* — Jaehwan Oh (57) ABSTRACT

Methods, computing systems, and computer-readable media for modeling a subterranean volume, of which the methods include receiving data representing a geology of the subterranean volume, calculating a mesh for a digital model of the subterranean volume, generating the digital model using the mesh and the data, wherein generating the digital model comprises defining an implicit function for isostratigraphic surfaces of the subterranean volume. calculating values for a plurality of data points in the model using the implicit function, determining a discrepancy value for the individual data points, identifying a sample domain in the digital model, determining a refined implicit function for the sample domain, and modeling the subterranean volume using the refined implicit function for the sample domain and the implicit function for an area outside of the sample domain in the digital model.

20 Claims, 7 Drawing Sheets (58) Field of Classification Search
CPC ... G01V 2210/665; E21B 43/26; E21B 43/00; G06F 2111/10
See application file for complete search history.

(56) References Cited

U.S. PATENT DOCUMENTS

| | | | |
|---|---|---|---|
| 2013/0238297 A1* | 9/2013 | Lepage | G09B 23/40 703/2 |
| 2015/0066460 A1 | 3/2015 | Klinger et al. | |
| 2015/0323701 A1* | 11/2015 | Mesri | E21B 43/00 703/2 |
| 2015/0355373 A1* | 12/2015 | Zhuo | G06F 17/10 703/2 |
| 2016/0018562 A1* | 1/2016 | Bratvedt | G01V 99/005 703/2 |
| 2016/0047925 A1* | 2/2016 | Lou | G01V 1/303 702/18 |
| 2016/0077237 A1* | 3/2016 | Sun | G01V 99/005 702/2 |
| 2016/0124116 A1 | 5/2016 | Souche et al. | |
| 2016/0139299 A1* | 5/2016 | Leger | E02D 1/022 703/2 |
| 2016/0202389 A1* | 7/2016 | Malvesin | G06F 17/16 703/2 |
| 2016/0370499 A1* | 12/2016 | Berard | G01V 99/00 |
| 2017/0154463 A1* | 6/2017 | von Cramon | G06T 15/04 |
| 2018/0313966 A1* | 11/2018 | Klinger | G01V 1/301 |
| 2018/0329113 A1* | 11/2018 | Walters | E21B 47/024 |
| 2018/0347320 A1 | 12/2018 | Renaudeau et al. | |
| 2018/0371874 A1* | 12/2018 | Shetty | E21B 49/08 |
| 2020/0292722 A1* | 9/2020 | Maucec | G01V 1/282 |

OTHER PUBLICATIONS

Caumon, et al., "Surface-Based 3D Modeling of Geological Structures," Mathematical Geosciences, vol. 41, Issue 8, pp. 927-945, 2009.

Chiles, et al., "Modelling the Geometry of Geological Units and its Uncertainty in 3D from Structural Data: The Potential-Field Method," Orebody Modeling and Strategic Mine Planning—Spectrum series 14, (July):22-24, 2004.

Durand-Riard, et al., "Balanced restoration of geological volumes with relaxed meshing constraints," Computer and Geosciences, Pergamon Press, Oxford, GB, vol. 36, No. 4, Apr. 1, 2010, pp. 441-452.

Frank, et al., "3D-reconstruction of complex geological interfaces from irregularly distributed and noisy point data," Computers & Geosciences, vol. 33, Issue 7, pp. 932-943, 2007.

Mallet, "Discrete Smooth Interpolation," Computer-aided Design, vol. 24, No. 4. pp. 178-191, 1992.

Souche, et al. "Construction of structurally and stratigraphically consistent structural models using the volume-based modelling technology: Applications to an Australian dataset," International Petroleum Technology Conference, held in Kuala Lumpur, Malaysia, Dec. 10-12, 2014.

Extended Search Report for the equivalent European patent application 18305187.9 dated Aug. 28, 2018.

\* cited by examiner

MESHLESS AND MESH-BASED TECHNIQUE FOR MODELING SUBTERRANEAN VOLUMES

CROSS REFERENCE TO RELATED APPLICATIONS

This application claims the benefit of priority to European Patent Application 18305187.9, filed on Feb. 23, 2018, the entire content of which is incorporated herein by reference.

BACKGROUND

Implicit structural modeling of a physical, subterranean volume of interest includes defining an implicit function that represents structural geology. Isovalues of this function represent horizons (changes of layers). A discontinuity in this function may be associated with a structural discontinuity in the subterranean volume, such as a fault or erosion.

In order to handle such discontinuities, techniques generally make an assumption of smoothness. Accordingly, smooth horizons are defined with transitions in the volumes in between being assumed to be smooth. The smoothness assumption gives a single solution to handling the presence of discontinuities in the implicit model while accurately representing, in most cases, structures in comparison to actual geological observations. Modeling accurately can be quantified as a minimum distance between the user data and the isovalues of the implicit function.

Solving the mathematical equations involved in modeling, using the smoothness function and taking into consideration the accuracy values, includes forming a mesh, i.e., a discretization, of the volume of interest. The accuracy of the implicit function depends on the resolution of this background mesh, with finer resolutions generally resulting in more accurate approximations. However, increasing mesh resolutions result in longer computation runtimes and larger model sizes in memory. Moreover, in many situations, even the finest available mesh resolution remains below the resolution of the user's data. This lack of resolution may lead to a poor data fitting, which may not be acceptable for fluid flow simulation or rock volume computations among other things.

SUMMARY

Embodiments of the disclosure may provide a method for modeling a subterranean volume. The method includes receiving data representing a geology of the subterranean volume, calculating a mesh for a digital model of the subterranean volume, and generating the digital model using the mesh and the data. Generating the digital model comprises defining an implicit function for isostratigraphic surfaces of the subterranean volume. The method also includes calculating values for a plurality of data points in the model using the implicit function. The plurality of data points is contained within a plurality of mesh elements of the mesh. The method further includes determining a discrepancy value for the individual data points by comparing the values to expected values corresponding to the respective data points, and identifying a sample domain in the digital model. The sample domain includes at least one mesh element of the plurality of mesh elements, the at least one mesh element containing at least one data point with the discrepancy value associated therewith exceeding a threshold. The method also includes determining a refined implicit function for the sample domain. The refined implicit function comprises a term calculated using a mesh-based modeling process and a term calculated using a meshless modeling technique. The method also includes modeling the subterranean volume using the refined implicit function for the sample domain and the implicit function for an area outside of the sample domain in the digital model.

A computing system including one or more processors, and a memory system including one or more non-transitory computer-readable media storing instructions that, when executed by the one or more processors, cause the computing system to perform operations. The operations include receiving data representing a geology of a subterranean volume, calculating a mesh for a digital model of the subterranean volume, and generating the digital model using the mesh and the data. Generating the digital model comprises defining an implicit function for isostratigraphic surfaces of the subterranean volume. The operations also include calculating values for a plurality of data points in the model using the implicit function. The plurality of data points is contained within a plurality of mesh elements of the mesh. The operations further include determining a discrepancy value for the individual data points by comparing the values to expected values corresponding to the respective data points, and identifying a sample domain in the digital model. The sample domain includes at least one mesh element of the plurality of mesh elements, the at least one mesh element containing at least one data point with the discrepancy value associated therewith exceeding a threshold. The operations also include determining a refined implicit function for the sample domain. The refined implicit function comprises a term calculated using a mesh-based modeling process and a term calculated using a meshless modeling technique. The operations also include modeling the subterranean volume using the refined implicit function for the sample domain and the implicit function for an area outside of the sample domain in the digital model.

Embodiments of the disclosure may further provide a non-transitory computer-readable medium storing instructions that, when executed by at least one processor of a computing system, cause the system to perform operations. The operations include receiving data representing a geology of a subterranean volume, calculating a mesh for a digital model of the subterranean volume, and generating the digital model using the mesh and the data. Generating the digital model comprises defining an implicit function for isostratigraphic surfaces of the subterranean volume. The operations also include calculating values for a plurality of data points in the model using the implicit function. The plurality of data points is contained within a plurality of mesh elements of the mesh. The operations further include determining a discrepancy value for the individual data points by comparing the values to expected values corresponding to the respective data points, and identifying a sample domain in the digital model. The sample domain includes at least one mesh element of the plurality of mesh elements, the at least one mesh element containing at least one data point with the discrepancy value associated therewith exceeding a threshold. The operations also include determining a refined implicit function for the sample domain. The refined implicit function comprises a term calculated using a mesh-based modeling process and a term calculated using a meshless modeling technique. The operations also include modeling the subterranean volume using the refined implicit function for the sample domain and the implicit function for an area outside of the sample domain in the digital model.

It will be appreciated that this summary is intended merely to introduce some aspects of the present methods, systems, and media, which are more fully described and/or claimed below. Accordingly, this summary is not intended to be limiting.

BRIEF DESCRIPTION OF THE DRAWINGS

The accompanying drawings, which are incorporated in and constitute a part of this specification, illustrate embodiments of the present teachings and together with the description, serve to explain the principles of the present teachings. In the figures.

DETAILED DESCRIPTION

Reference will now be made in detail to embodiments, examples of which are illustrated in the accompanying drawings and figures. In the following detailed description, numerous specific details are set forth in order to provide a thorough understanding of the invention. However, it will be apparent to one of ordinary skill in the art that the invention may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first object or step could be termed a second object or step, and, similarly, a second object or step could be termed a first object or step, without departing from the scope of the present disclosure. The first object or step, and the second object or step, are both, objects or steps, respectively, but they are not to be considered the same object or step.

The terminology used in the description herein is for the purpose of describing particular embodiments and is not intended to be limiting. As used in this description and the appended claims, the singular forms "a," "an" and "the" are intended to include the plural forms as well, unless the context clearly indicates otherwise. It will also be understood that the term "and/or" as used herein refers to and encompasses any possible combinations of one or more of the associated listed items. It will be further understood that the terms "includes," "including," "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Further, as used herein, the term "if" may be construed to mean "when" or "upon" or "in response to determining" or "in response to detecting," depending on the context.

Attention is now directed to processing procedures, methods, techniques, and workflows that are in accordance with some embodiments. Some operations in the processing procedures, methods, techniques, and workflows disclosed herein may be combined and/or the order of some operations may be changed.

Figure 1:
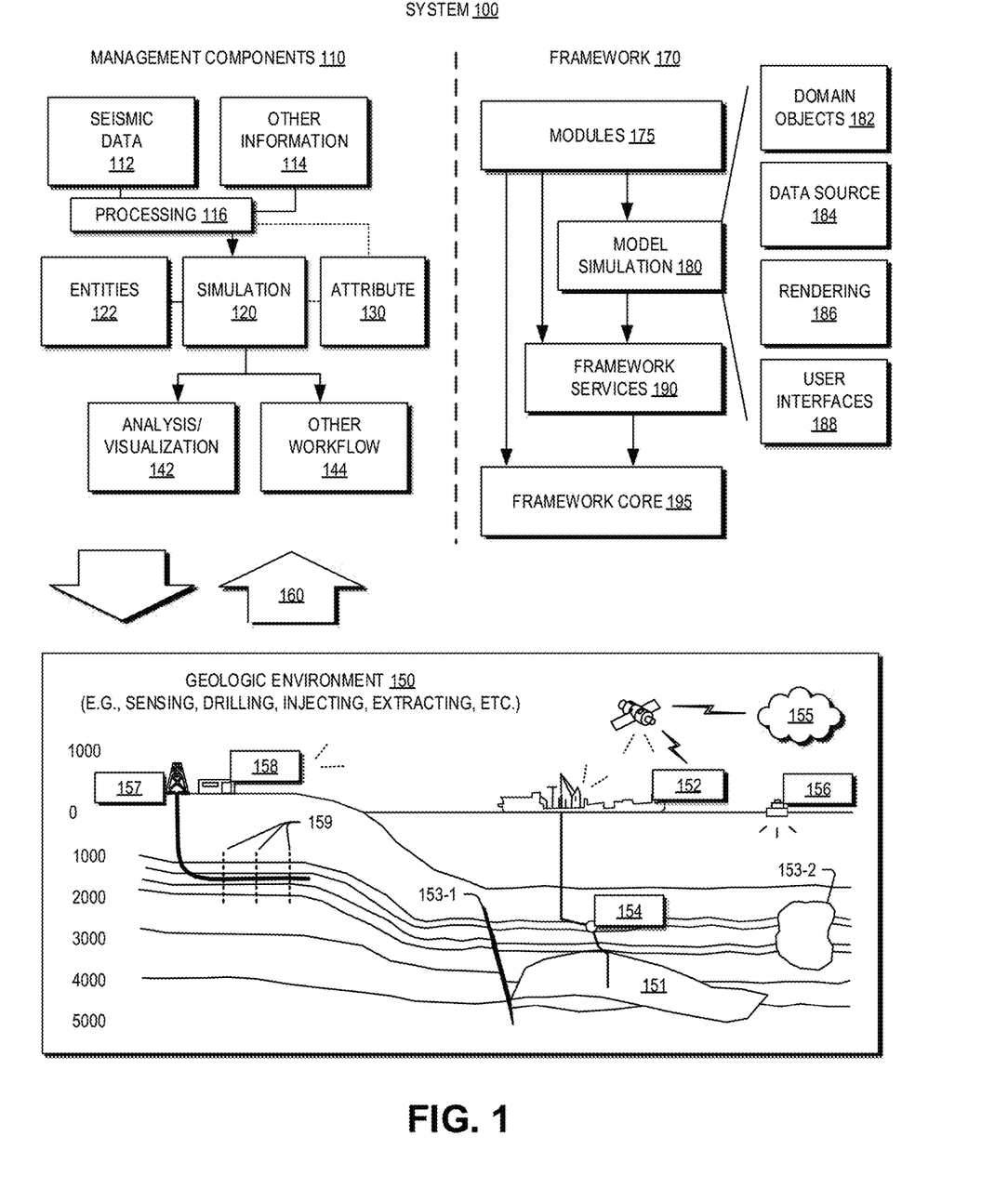
FIG. 1 illustrates an example of a system that includes various management components to manage various aspects of a geologic environment, according to an embodiment.

FIG. 1 illustrates an example of a system 100 that includes various management components 110 to manage various aspects of a geologic environment 150 (e.g., an environment that includes a sedimentary basin, a reservoir 151, one or more faults 153-1, one or more geobodies 153-2, etc.). For example, the management components 110 may allow for direct or indirect management of sensing, drilling, injecting, extracting, etc., with respect to the geologic environment 150. In turn, further information about the geologic environment 150 may become available as feedback 160 (e.g., optionally as input to one or more of the management components 110).

In the example of FIG. 1, the management components 110 include a seismic data component 112, an additional information component 114 (e.g., well/logging data), a processing component 116, a simulation component 120, an attribute component 130, an analysis/visualization component 142 and a workflow component 144. In operation, seismic data and other information provided per the components 112 and 114 may be input to the simulation component 120.

In an example embodiment, the simulation component 120 may rely on entities 122. Entities 122 may include earth entities or geological objects such as wells, surfaces, bodies, reservoirs, etc. In the system 100, the entities 122 can include virtual representations of actual physical entities that are reconstructed for purposes of simulation. The entities 122 may include entities based on data acquired via sensing, observation, etc. (e.g., the seismic data 112 and other information 114). An entity may be characterized by one or more properties (e.g., a geometrical pillar grid entity of an earth model may be characterized by a porosity property). Such properties may represent one or more measurements (e.g., acquired data), calculations, etc.

In an example embodiment, the simulation component 120 may operate in conjunction with a software framework such as an object-based framework. In such a framework, entities may include entities based on pre-defined classes to facilitate modeling and simulation. A commercially available example of an object-based framework is the MICROSOFT®.NET® framework (Redmond, Wash.), which provides a set of extensible object classes. In the .NET® framework, an object class encapsulates a module of reusable code and associated data structures. Object classes can be used to instantiate object instances for use in by a program, script, etc. For example, borehole classes may define objects for representing boreholes based on well data.

In the example of FIG. 1, the simulation component 120 may process information to conform to one or more attributes specified by the attribute component 130, which may include a library of attributes. Such processing may occur prior to input to the simulation component 120 (e.g., consider the processing component 116). As an example, the simulation component 120 may perform operations on input information based on one or more attributes specified by the attribute component 130. In an example embodiment, the simulation component 120 may construct one or more models of the geologic environment 150, which may be relied on to simulate behavior of the geologic environment 150 (e.g., responsive to one or more acts, whether natural or artificial). In the example of FIG. 1, the analysis/visualization component 142 may allow for interaction with a model or model-based results (e.g., simulation results, etc.). As an example, output from the simulation component 120 may be input to one or more other workflows, as indicated by a workflow component 144.

As an example, the simulation component 120 may include one or more features of a simulator such as the ECLIPSE™ reservoir simulator (Schlumberger Limited, Houston Tex.), the IN IERSECT™ reservoir simulator (Schlumberger Limited, Houston Tex.), etc. As an example, a simulation component, a simulator, etc. may include features to implement one or more meshless techniques (e.g., to solve one or more equations, etc.). As an example, a reservoir or reservoirs may be simulated with respect to one or more enhanced recovery techniques (e.g., consider a thermal process such as SAGD, etc.).

In an example embodiment, the management components 110 may include features of a commercially available framework such as the PETREL® seismic to simulation software framework (Schlumberger Limited, Houston, Tex.). The PETREL® framework provides components that allow for optimization of exploration and development operations. The PETREL® framework includes seismic to simulation software components that can output information for use in increasing reservoir performance, for example, by improving asset team productivity. Through use of such a framework, various professionals (e.g., geophysicists, geologists, and reservoir engineers) can develop collaborative workflows and integrate operations to streamline processes. Such a framework may be considered an application and may be considered a data-driven application (e.g., where data is input for purposes of modeling, simulating, etc.).

In an example embodiment, various aspects of the management components 110 may include add-ons or plug-ins that operate according to specifications of a framework environment. For example, a commercially available framework environment marketed as the OCEAN® framework environment (Schlumberger Limited, Houston, Tex.) allows for integration of add-ons (or plug-ins) into a PETREL® framework workflow. The OCEAN® framework environment leverages NET® tools (Microsoft Corporation, Redmond, Wash.) and offers stable, user-friendly interfaces for efficient development. In an example embodiment, various components may be implemented as add-ons (or plug-ins) that conform to and operate according to specifications of a framework environment (e.g., according to application programming interface (API) specifications, etc.).

FIG. 1 also shows an example of a framework 170 that includes a model simulation layer 180 along with a framework services layer 190, a framework core layer 195 and a modules layer 175. The framework 170 may include the commercially available OCEAN® framework where the model simulation layer 180 is the commercially available PETREL® model-centric software package that hosts OCEAN® framework applications. In an example embodiment, the PETREL® software may be considered a data-driven application. The PETREL® software can include a framework for model building and visualization.

As an example, a framework may include features for implementing one or more mesh generation techniques. For example, a framework may include an input component for receipt of information from interpretation of seismic data, one or more attributes based at least in part on seismic data, log data, image data, etc. Such a framework may include a mesh generation component that processes input information, optionally in conjunction with other information, to generate a mesh.

In the example of FIG. 1, the model simulation layer 180 may provide domain objects 182, act as a data source 184, provide for rendering 186 and provide for various user interfaces 188. Rendering 186 may provide a graphical environment in which applications can display their data while the user interfaces 188 may provide a common look and feel for application user interface components.

As an example, the domain objects 182 can include entity objects, property objects and optionally other objects. Entity objects may be used to geometrically represent wells, surfaces, bodies, reservoirs, etc., while property objects may be used to provide property values as well as data versions and display parameters. For example, an entity object may represent a well where a property object provides log information as well as version information and display information (e.g., to display the well as part of a model).

In the example of FIG. 1, data may be stored in one or more data sources (or data stores, generally physical data storage devices), which may be at the same or different physical sites and accessible via one or more networks. The model simulation layer 180 may be configured to model projects. As such, a particular project may be stored where stored project information may include inputs, models, results and cases. Thus, upon completion of a modeling session, a user may store a project. At a later time, the project can be accessed and restored using the model simulation layer 180, which can recreate instances of the relevant domain objects.

In the example of FIG. 1, the geologic environment 150 may include layers (e.g., stratification) that include a reservoir 151 and one or more other features such as the fault 153-1, the geobody 153-2, etc. As an example, the geologic environment 150 may be outfitted with any of a variety of sensors, detectors, actuators, etc. For example, equipment 152 may include communication circuitry to receive and to transmit information with respect to one or more networks 155. Such information may include information associated with downhole equipment 154, which may be equipment to acquire information, to assist with resource recovery, etc. Other equipment 156 may be located remote from a well site and include sensing, detecting, emitting or other circuitry. Such equipment may include storage and communication circuitry to store and to communicate data, instructions, etc. As an example, one or more satellites may be provided for purposes of communications, data acquisition, etc. For example, FIG. 1 shows a satellite in communication with the network 155 that may be configured for communications, noting that the satellite may additionally or instead include circuitry for imagery (e.g., spatial, spectral, temporal, radiometric, etc.).

FIG. 1 also shows the geologic environment 150 as optionally including equipment 157 and 158 associated with a well that includes a substantially horizontal portion that may intersect with one or more fractures 159. For example, consider a well in a shale formation that may include natural fractures, artificial fractures (e.g., hydraulic fractures) or a combination of natural and artificial fractures. As an example, a well may be drilled for a reservoir that is laterally extensive. In such an example, lateral variations in properties, stresses, etc. may exist where an assessment of such variations may assist with planning, operations, etc. to develop a laterally extensive reservoir (e.g., via fracturing, injecting, extracting, etc.). As an example, the equipment 157 and/or 158 may include components, a system, systems, etc. for fracturing, seismic sensing, analysis of seismic data, assessment of one or more fractures, etc.

As mentioned, the system 100 may be used to perform one or more workflows. A workflow may be a process that includes a number of worksteps. A workstep may operate on data, for example, to create new data, to update existing data, etc. As an example, a may operate on one or more inputs and create one or more results, for example, based on one or more algorithms. As an example, a system may include a workflow editor for creation, editing, executing, etc. of a workflow. In such an example, the workflow editor may provide for selection of one or more pre-defined worksteps, one or more customized worksteps, etc. As an example, a workflow may be a workflow implementable in the PETREL® software, for example, that operates on seismic data, seismic attribute(s), etc. As an example, a workflow may be a process implementable in the OCEAN framework. As an example, a workflow may include one or more worksteps that access a module such as a plug-in (e.g., external executable code, etc.).

Figure 2A:
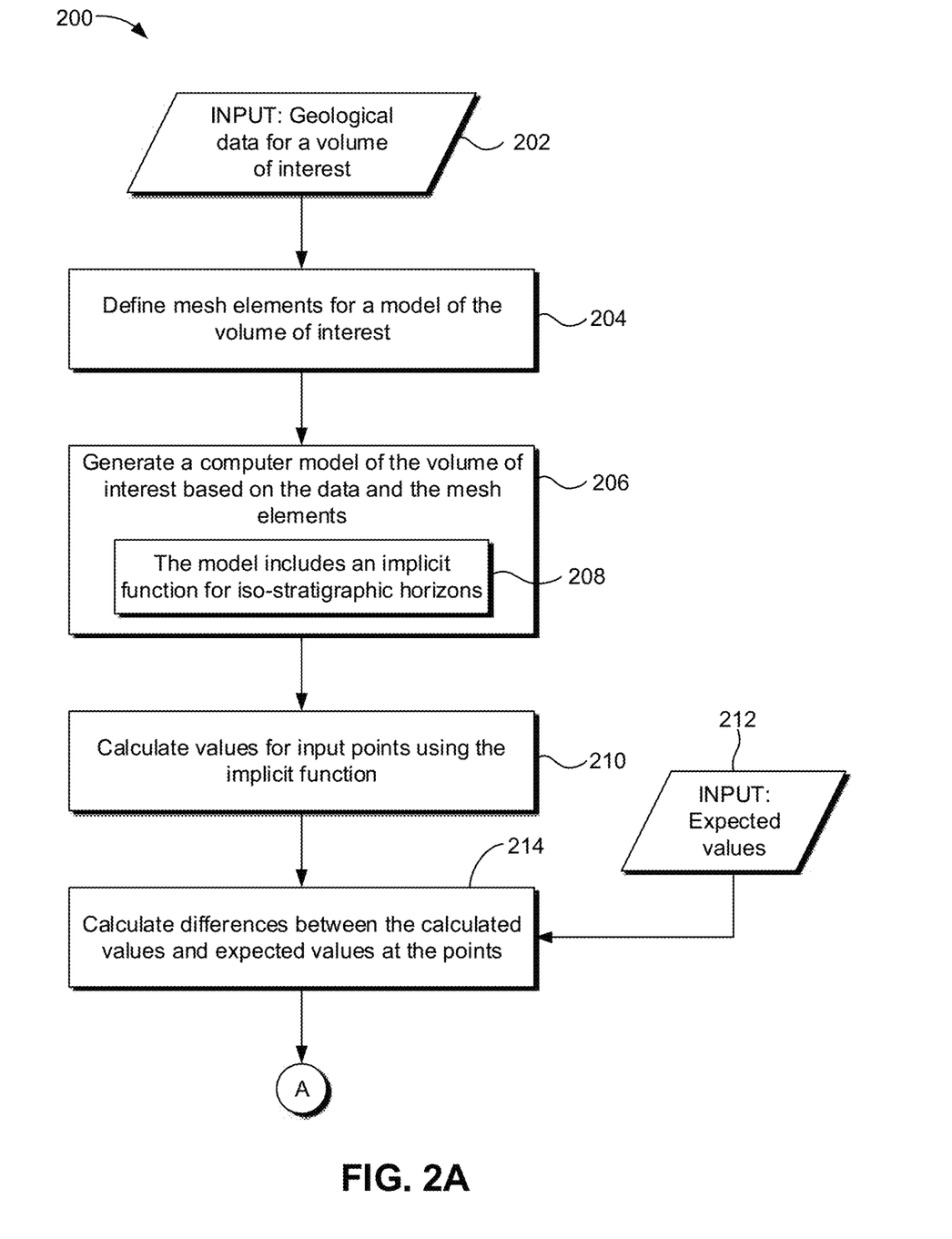
FIGS. 2A and 2B illustrate a flowchart of a method for modeling a subterranean volume, according to an embodiment.
Figure 2B:
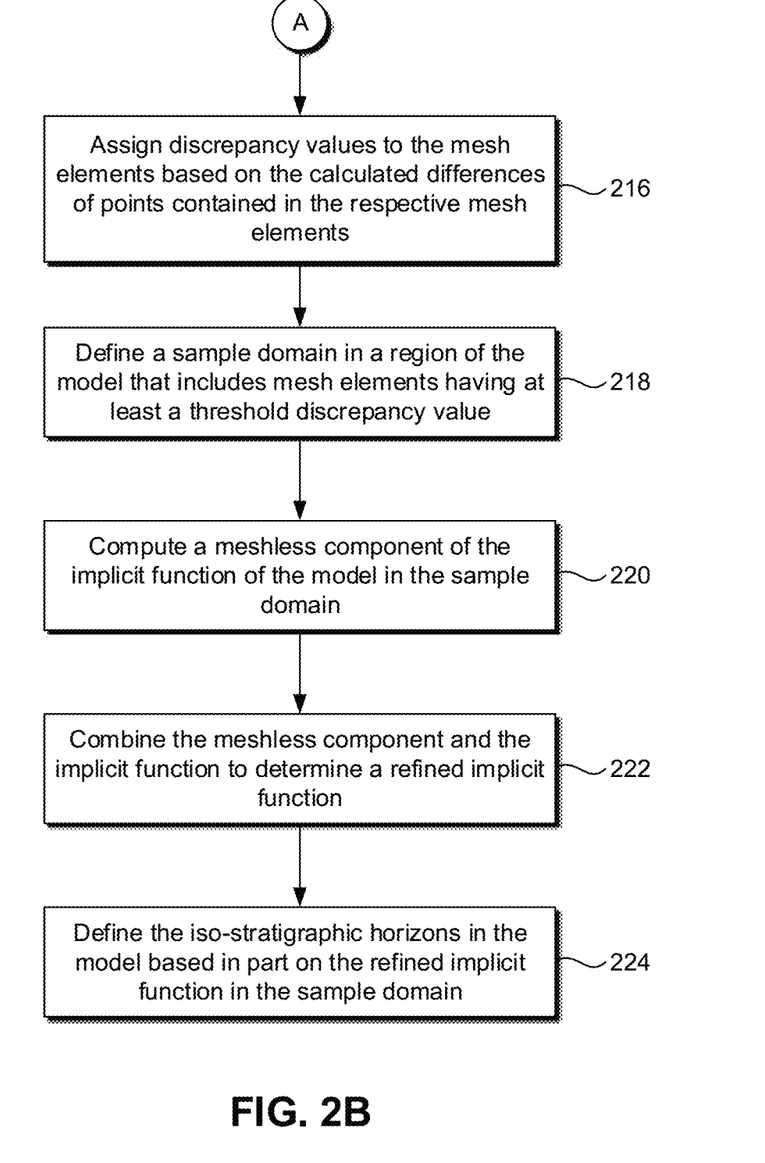

FIG. 2 illustrates a flowchart of a method 200 for modeling a subterranean volume, according to an embodiment. The method 200 may begin with creating an initial model, e.g., a digital computer model of the subterranean volume. In an embodiment, as shown, initiating the model starts by receiving input geological data for the volume of interest, as at 202. The data may be any sort of geological data, from any suitable source, such as core sample data, well logs, seismic data, etc. Thus, the data may be collected by physical instruments, e.g., in a laboratory or deployed in the oilfield, the measurements of which may represent real-world data. The model may thus be considered a digital representation of an "image" of the subterranean volume.

The method 200 may then include defining mesh elements for the model of the volume of interest, as at 204. The method 200 may then include generating the model of the volume of interested based on the input data and the mesh elements, as at 206. The model may be an implicit model, as mentioned above, and may thus include an implicit function, as indicated at 208, which may be employed to define iso-stratigraphic horizons ("iso-surfaces"), e.g., where values are the same for the function in the model. A variety of techniques for determining implicit functions are available and any suitable technique may be employed consistent with the present disclosure.

Figure 3:
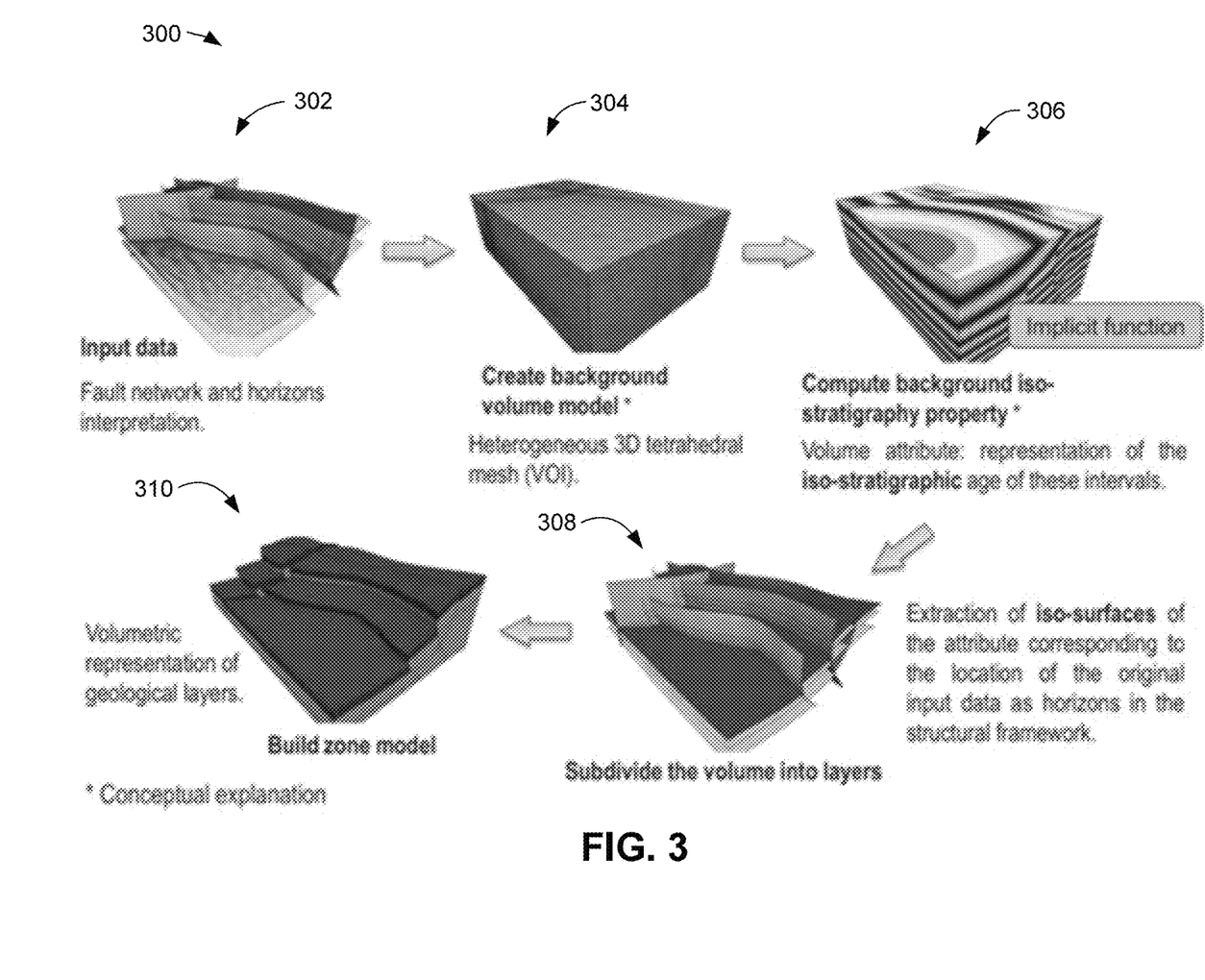
FIG. 3 illustrates a conceptual view of a model-generating technique, according to an embodiment.

Referring now to FIG. 3, there is shown a conceptual view of a process 300 for building the model, as discussed above, according to an embodiment. The process 300 may include receiving input data, as at 302. The input data may include fault network and horizon interpretation. Next, the background volume model may be created, which may include defining the mesh, as at 304. The mesh of the volume of interest may be any suitable mesh, for example, a heterogeneous three-dimensional (3D) tetrahedral mesh. The process 300 may then include computing the background isostratigraphic property, e.g., developing an implicit function of the model, as at 306. The model may include a volume attribute, which may be a representation of the isostratigraphic age of the intervals between the iso-surfaces.

The process 300 may then extract the iso-surfaces of the volume attribute corresponding to the location of the original input data as horizons in the structure framework. As indicated at 308, this may allow the volume to be subdivided into geological layers. The process 300 may then proceed to building a zone model, as at 308, which may include a volumetric representation of the geological layers.

Returning to FIG. 2A, once the model and mesh are generated, or potentially while such model and mesh are being created, the method 200 may include determining values for input points using the implicit function defined in the model, as at 210.

A second input may be fed into the method 200, as at 212. This input may provide expected values for various points in the model, e.g., at least some of the points for which values are determined in the model using the implicit function at 210. The method 200 may employ these expected values for a comparison with the calculated values, as at 214, which may yield error approximations for the implicit function at the respective points. The expected values received at 212 may be calculated using any suitable technique.

As an example, the expected values can be pre-computed from the relative thicknesses of the input data. Let $\{p_i\}$ be all the input points representing horizon $H_i$. $F_i$ is the prescribed isovalue to be computed for $H_i$. First, estimate the relative thicknesses between all the input horizons. To do this, for example, the domain interest can be discretized using a regular grid. Then the cells containing all the input data may be marked. The cell $\{u,v,w_1\}$ may be assumed to contain a data point pi of horizon i and another cell $\{u,v,w_2\}$ may be assumed to contain a data point $p_j$ of horizon j (note that the two cells are on the same vertical line defined by the same u and v). Then the thickness between horizons i and j for this vertical line may be defined by the "vertical distance ij" $\|p_i p_j\|$. The thickness between horizons i and j may be defined as the average of the all vertical distances ij.

Thus, to compute the Fi values, the isovalue 0 may be assigned to the lowest horizon $H_b$ and the isovalue 1 to the top-most horizon $H_t$. For any intermediate horizon $H_i$, the value $F_i$ is calculated by the ratio of the thicknesses $$Fi = \frac{\Delta h_{bi}}{\Delta h_{bt}}$$

where $\Delta h_{bi}$ and $\Delta h_{bt}$ are respectively the estimated thicknesses between the horizons $H_b$–Hi and $H_b$–$H_t$.

Continuing to FIG. 2B, the method 200 may include assigning discrepancy values to the mesh elements based on the calculated differences of points contained in the respective mesh elements, as at 212. For example, each mesh element may contain several (potentially many) input points. The difference between the expected value and the calculated value may be determined, in some embodiments, for each point in each mesh element for which values are available. In other embodiments, a representative subset of the points in the mesh element may be used. The difference between the expected value and the calculated value for each point is the discrepancy value. Each mesh element may then be assigned one of the discrepancy values, e.g., the largest discrepancy value calculated for a point contained within the mesh element.

Figure 4:
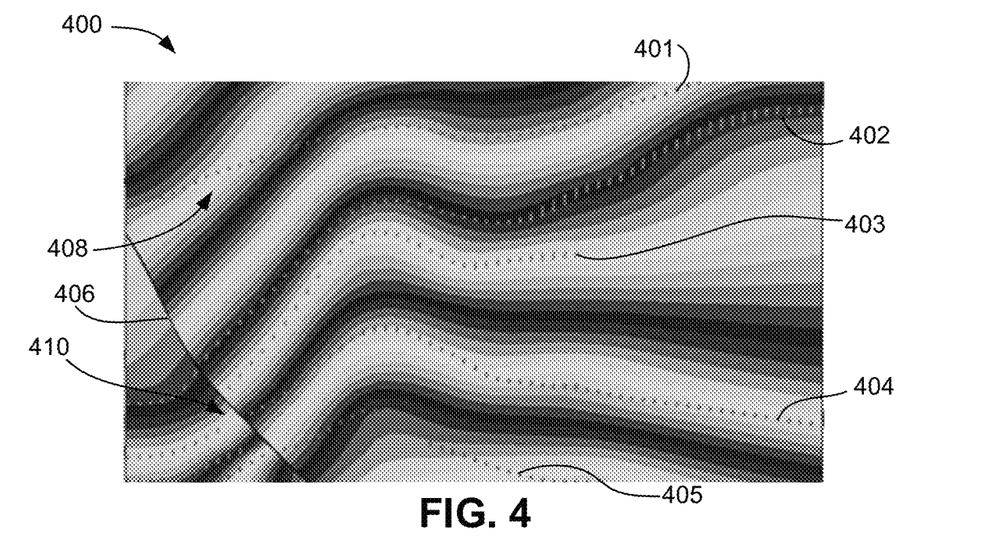
FIG. 4 illustrates a view of horizons in a model of the subterranean volume based on an implicit function, according to an embodiment.

FIG. 4 illustrates an example of a model 400 having a mesh and several isostratigraphic surfaces ("iso-surfaces") 401, 402, 403, 404, 405 defined therein. A discontinuity 406, such as a fault, may cut through the iso-surfaces 401-405, which may result in poor definition of the iso-surfaces 401-405 compared to the geology, as is visible, e.g., at portions 408, 410. Close inspection of FIG. 4 reveals additional poor definition areas; the portions 408, 410 are merely examples to illustrate the concept. These may be areas where the meshes are assigned high discrepancy values.

Returning to FIG. 2, the method 200 may then include defining a sample domain in a region of the model that includes mesh elements having at least a threshold discrepancy value, as at 214. For example, the method 200 may include searching through each, or a representative subset, or the mesh elements to identify those with unsuitably high discrepancy values. Unsuitably high discrepancy values may be those that exceed a threshold. The threshold may be a static variable, input, for example, by a user or otherwise predefined. In other embodiments, the threshold may be dynamic and set, for example, in order to capture a certain number or percentage of the mesh elements. Once the mesh elements are identified, the sample domain may be defined as encompassing the identified mesh elements (and potentially some of the neighboring mesh elements, e.g., in situations in which a group of proximal mesh elements are interspersed with mesh elements with a discrepancy value that falls below the threshold).

Figure 5:
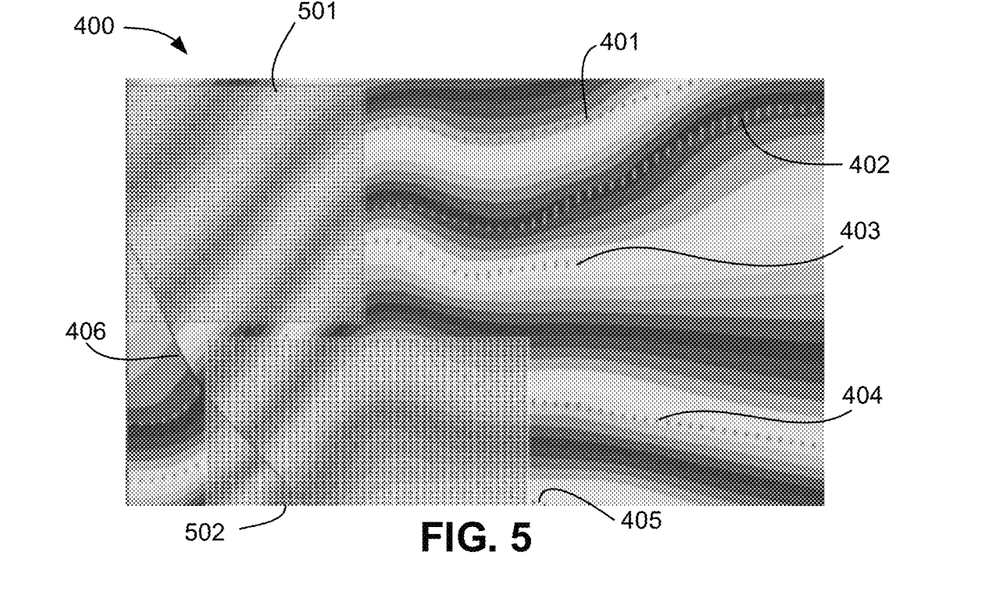
FIG. 5 illustrates a view of the model of the subterranean volume with a sample domain identified for meshless refinement, according to an embodiment.

FIG. 5 illustrates a view of the model 400 (zoomed out), with two sample domains 501, 502 defined proximal to the discontinuity 406. As shown, the sample domains 501, 502 may include the portions 408, 410 where the iso-surfaces 401-405 are poorly defined. Further, the sample domain 501 may have a greater resolution than the sample domain 502, and thus any domains defined may have the same or differing resolutions. As illustrated, the sample domains 501, 502 may not include areas away from the discontinuity 406, or where the iso-surfaces 401-405 are otherwise well-defined by the implicit function. The sampling resolution can be constant or adaptive according the quality of the refined solution. In this last case, the workflow may be iterative, and may allow a user to set and increase the resolution. A default resolution can be proposed, e.g., by a regular grid Nx*Ny*Nz with Nx=Ny=Nz=10, to name one specific example among many contemplated.

Returning to FIG. 2, the method 200 may then proceed to computing a meshless component (or term) of the implicit function of the model in the sample domain, as at 216. The meshless component may be determined using a meshless technique including a weighted curvature minimization criterion, as will be described in greater detail below. Other techniques for defining a meshless component may also be used. The meshless component may not rely on mesh elements, as the name implies, and thus may not have the same resolution constraints thereof, as explained above. Thus, in the sample domain with the meshless component, the implicit function may be calculated with the same effective resolution as the input data set.

The method 200 may then include combining the meshless component and the implicit function, thereby defining a refined implicit function, as at 218. Accordingly, the model may include portions that are calculated using the implicit function without the meshless component, as well as one or more sample domains of the model in which implicit function is refined to incorporate the meshless component. This may represent a suitable tradeoff between accuracy and computational efficiency by resolution-matching to avoid highly-inaccurate iso-surface defining, while employing lower resolutions where the iso-surfaces are adequately modeled. Accordingly, the method 200 may then proceed to defining the isostratigraphic horizons (surfaces) in the model used in part on the refined implicit function in the sample domain, as at 220, while retaining the isostratigraphic surfaces in the areas outside of the sample domain(s).

Figure 6:
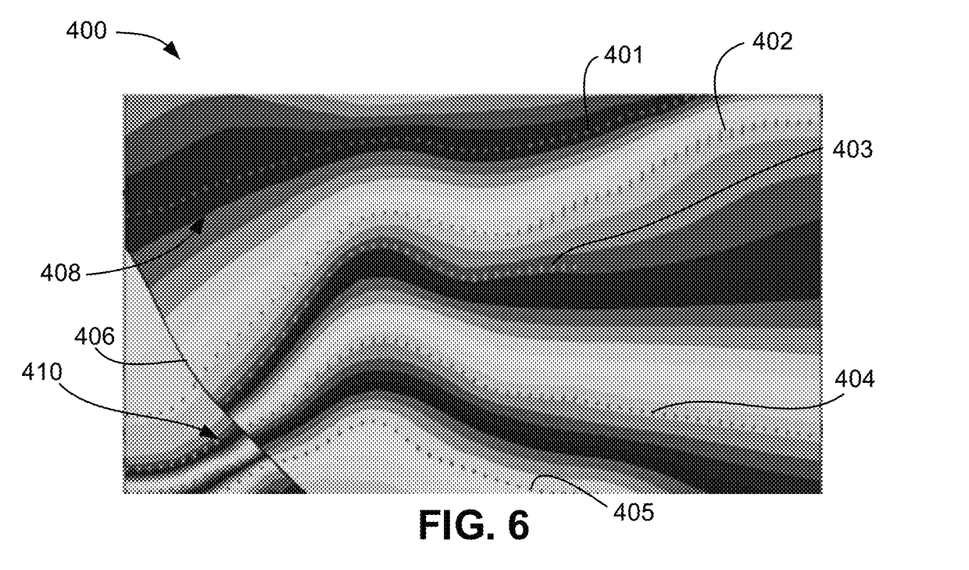
FIG. 6 illustrates a view of the model of the subterranean volume with horizons identified using a refined implicit function that includes the meshless refinement, according to an embodiment.

FIG. 6 illustrates a view of the model 400 after the refined implicit model is applied in the sample domain. As is visible, the portions 408, 410 align more closely with the geology, and thus reflect well-defined iso-surfaces.

In greater detail, according to an embodiment, the method may include first computing the low resolution part ($f_{LRIF}$) of the implicit function using a volume-based methods. The mesh remains at low resolution and the resulting implicit function is given by:

$$f_{LRIF} = \Sigma_i \Phi_{FEM} f_i \qquad (1)$$

where $\Phi_{FEM}$ represents the finite element shape functions and $f_i$ represents the nodal values of the function.

For each data point $p_i$ a discrepancy $\delta p_i$ may be computed by comparison with its expected value $F_i$ of the implicit function:

$$\delta p_i = |f_{LRIF}(p_i) - F_i| \qquad (2)$$

In an embodiment, the discrepancy values may then be sorted, e.g., in decreasing order to name one specific example. For each mesh tetrahedra, if it contains one or more points $p_i$, the maximum values of the discrepancies $\delta p_i$ may be assigned to the tetrahedra, and zero otherwise.

Sample domains may then be defined at or around the region of high discrepancy. A sample domain is a set of points (sample points). The sample points may be regularly distributed or not. The resolution of a sampling region can be defined as the number of sample points with respect to the Euclidian size of the domain.

A meshless technique may then be applied to determine a refined implicit function in the sample domain. The meshless technique may include, for example, a weighted curvature minimization (WCM) criterion to a corrective $\delta f$ component.

By way of a brief explanation, the corrective $\delta f$ component may be computed by solving a minimization problem modeling both the interpolation of the input data and a smoothness requirement. The WCM criterion models the smoothness by minimizing the second derivatives with an adaptive weight relaxing the smoothness near the input data to enforce the quality of the fitting. Any meshless shape functions $\Phi_k^{meshless}$ with enough regularity (continuous second derivatives) can be used to represent the solution $\delta f$ as:

$$\delta f(x) = \Sigma_k^{Meshless}(x) \delta f_k \qquad (3)$$

Further, continuity of the implicit function may be maintained across the meshed and hybrid (sample) regions. To do so, a continuity equation may be added to WCM techniques, where $\delta f = 0$ on the "boundary" of the sampled domain.

The formulation yields fitting questions, which describe the condition that forces the implicit function to be constant over the data points. For example, given a data point $p_i$ and its targeted value $F_i$, this condition may be:

$$f_{HR}(p_i) = f_{LRIF}(p_i) + \delta f_{detail}^{Meshless}(p_i) = F_i \qquad (4)$$

Keeping in the left members the unknows $\{\delta f_k\}_k$ only, results in the following linear equations:

$$\Sigma_k^{Meshless}(p_i) \delta f_k = F_i - f_{LRIF}(p_i) \qquad (5)$$

Smoothing equations are given by WCM. Further, continuity equations may be developed. For example, for each sample point k of the "boundary" of the sampling domain, $\delta f_k = 0$, as mentioned above.

Let $\delta f_{detail}^{Meshless}$ the solution of the meshless problem of equation 5. The refined implicit function is finally obtained by summing the two contributions. Further, $$f_{HR} + f_{LRIF} + \delta f_{detail}^{Meshless} = \Sigma_i \Phi_i^{FEM} f_i + \Sigma_k \Phi_k^{Meshless} \delta f_k \quad (6)$$

In some embodiments, the method may be formulated as a full meshless method. In such embodiments, the low resolution implicit function and the corrective details are both computed by a WCM technique (or another meshless technique). For example, such technique may be described as:

$$f_{HR} = f_{LRIF} + \delta f_{detail}^{Meshless} = \underbrace{\sum_i \Phi_i^{Meshless} f_i}_{\text{low resolution}} + \underbrace{\sum_k \Phi_k^{Meshless} \delta f_k}_{\text{high resolution}} \quad (7)$$

Figure 7:
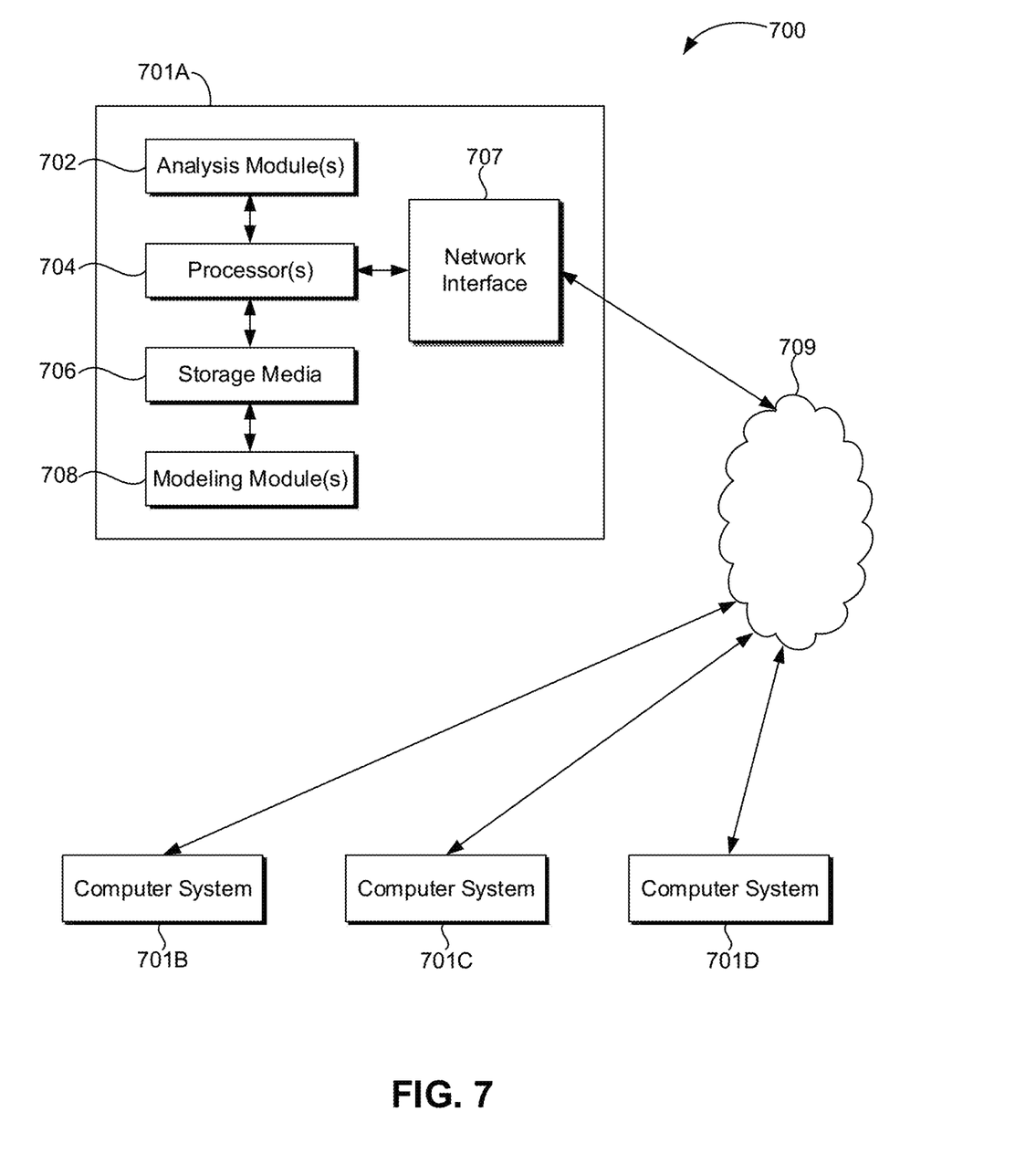
FIG. 7 illustrates a schematic view of a computing system, according to an embodiment.

In some embodiments, the methods of the present disclosure may be executed by a computing system. FIG. 7 illustrates an example of such a computing system 700, in accordance with some embodiments. The computing system 700 may include a computer or computer system 701A, which may be an individual computer system 701A or an arrangement of distributed computer systems. The computer system 701A includes one or more analysis modules 702 that are configured to perform various tasks according to some embodiments, such as one or more methods disclosed herein. To perform these various tasks, the analysis module 602 executes independently, or in coordination with, one or more processors 704, which is (or are) connected to one or more storage media 706. The processor(s) 704 is (or are) also connected to a network interface 707 to allow the computer system 701A to communicate over a data network 709 with one or more additional computer systems and/or computing systems, such as 701B, 701C, and/or 701D (note that computer systems 701B, 701C and/or 701D may or may not share the same architecture as computer system 701A, and may be located in different physical locations, e.g., computer systems 701A and 701B may be located in a processing facility, while in communication with one or more computer systems such as 701C and/or 701D that are located in one or more data centers, and/or located in varying countries on different continents).

A processor may include a microprocessor, microcontroller, processor module or subsystem, programmable integrated circuit, programmable gate array, or another control or computing device.

The storage media 706 may be implemented as one or more computer-readable or machine-readable storage media. Note that while in the example embodiment of FIG. 7 storage media 706 is depicted as within computer system 701A, in some embodiments, storage media 706 may be distributed within and/or across multiple internal and/or external enclosures of computing system 701A and/or additional computing systems. Storage media 706 may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories, magnetic disks such as fixed, floppy and removable disks, other magnetic media including tape, optical media such as compact disks (CDs) or digital video disks (DVDs), BLURAY® disks, or other types of optical storage, or other types of storage devices. Note that the instructions discussed above may be provided on one computer-readable or machine-readable storage medium, or may be provided on multiple computer-readable or machine-readable storage media distributed in a large system having possibly plural nodes. Such computer-readable or machine-readable storage medium or media is (are) considered to be part of an article (or article of manufacture). An article or article of manufacture may refer to any manufactured single component or multiple components. The storage medium or media may be located either in the machine running the machine-readable instructions, or located at a remote site from which machine-readable instructions may be downloaded over a network for execution.

In some embodiments, computing system 700 contains one or more modeling module(s) 708. In the example of computing system 700, computer system 701A includes the modeling module 508. In some embodiments, a single modeling module may be used to perform some aspects of one or more embodiments of the methods disclosed herein. In other embodiments, a plurality of modeling modules may be used to perform some aspects of methods herein.

It should be appreciated that computing system 700 is merely one example of a computing system, and that computing system 700 may have more or fewer components than shown, may combine additional components not depicted in the example embodiment of FIG. 7, and/or computing system 700 may have a different configuration or arrangement of the components depicted in FIG. 7. The various components shown in FIG. 7 may be implemented in hardware, software, or a combination of both hardware and software, including one or more signal processing and/or application specific integrated circuits.

Further, the steps in the processing methods described herein may be implemented by running one or more functional modules in information processing apparatus such as general purpose processors or application specific chips, such as ASICs, FPGAs, PLDs, or other appropriate devices. These modules, combinations of these modules, and/or their combination with general hardware are included within the scope of the present disclosure.

Geologic interpretations, models, and/or other interpretation aids may be refined in an iterative fashion; this concept is applicable to the methods discussed herein. This may include use of feedback loops executed on an algorithmic basis, such as at a computing device (e.g., computing system 700, FIG. 7), and/or through manual control by a user who may make determinations regarding whether a given step, action, template, model, or set of curves has become sufficiently accurate for the evaluation of the subsurface three-dimensional geologic formation under consideration.

The foregoing description, for purpose of explanation, has been described with reference to specific embodiments. However, the illustrative discussions above are not intended to be exhaustive or limiting to the precise forms disclosed. Many modifications and variations are possible in view of the above teachings. Moreover, the order in which the elements of the methods described herein are illustrate and described may be re-arranged, and/or two or more elements may occur simultaneously. The embodiments were chosen and described in order to best explain the principals of the disclosure and its practical applications, to thereby enable others skilled in the art to best utilize the disclosed embodiments and various embodiments with various modifications as are suited to the particular use contemplated.

What is claimed is:

1. A method for modeling a subterranean volume, comprising:

receiving data representing a geology of the subterranean volume, wherein the data comprise data derived from seismic sensing equipment;

calculating a mesh for a digital model of the subterranean volume;

generating the digital model using the mesh and the data, wherein generating the digital model comprises defining an implicit function for isostratigraphic surfaces of the subterranean volume;

calculating values for data points in the model using the implicit function, wherein the data points are contained within mesh elements of the mesh;

determining a discrepancy value for one or more of the data points by comparing one or more of the values to one or more expected values corresponding to the one or more of the data points;

identifying a sample domain in the digital model, wherein the sample domain includes at least one mesh element of the mesh elements, the at least one mesh element containing at least one of the one or more of the data points with the discrepancy value associated therewith exceeding a threshold;

determining a refined implicit function for the sample domain, wherein the refined implicit function comprises a term calculated using a mesh-based modeling process and a term calculated using a meshless modeling technique;

modeling the subterranean volume using the refined implicit function for the sample domain and the implicit function for an area outside of the sample domain in the digital model; and based on the modeling, generating a revised digital model, wherein at least one of the isostratigraphic surfaces in the revised digital model is spatially refined using the refined implicit function to represent structure of the subterranean volume based at least in part on the data.

2. The method of claim 1, wherein the threshold is predetermined.

3. The method of claim 1, wherein the meshless modeling technique comprises a weighted curvature minimization criterion.

4. The method of claim 1, wherein modeling the subterranean volume comprises constraining the meshless term of the refined implicit function to zero at a boundary of the sample domain.

5. The method of claim 1, wherein the mesh elements comprise tetrahedra.

6. The method of claim 1, wherein the sample domain is proximal to or includes a discontinuity in the digital model.

7. The method of claim 1, wherein the sample domain is a first sample domain, the method further comprising:
identifying a second sample domain in the digital model, wherein the second sample domain has a different resolution that the first sample domain; and
determining the refined implicit function for the second sample domain, wherein modeling the subterranean volume comprises using the refined implicit function for the second sample domain.

8. A computing system, comprising:
one or more processors; and
a memory system including one or more non-transitory computer-readable media storing instructions that, when executed by the one or more processors, cause the computing system to perform operations, the operations comprising:

receiving data representing a geology of a subterranean volume, wherein the data comprise data derived from seismic sensing equipment;

calculating a mesh for a digital model of the subterranean volume;

generating the digital model using the mesh and the data, wherein generating the digital model comprises defining an implicit function for isostratigraphic surfaces of the subterranean volume;

calculating values for data points in the model using the implicit function, wherein the data points are contained within mesh elements of the mesh;

determining a discrepancy value for one or more of the data points by comparing one or more of the values to one or more expected values corresponding to the one or more of the data points;

identifying a sample domain in the digital model, wherein the sample domain includes at least one mesh element of the mesh elements, the at least one mesh element containing at least one of the one or more of the data points with the discrepancy value associated therewith exceeding a threshold;

determining a refined implicit function for the sample domain, wherein the refined implicit function comprises a term calculated using a mesh-based modeling process and a term calculated using a meshless modeling technique;

modeling the subterranean volume using the refined implicit function for the sample domain and the implicit function for an area outside of the sample domain in the digital model; and based on the modeling, generating a revised digital model, wherein at least one of the isostratigraphic surfaces in the revised digital model is spatially refined using the refined implicit function to represent structure of the subterranean volume based at least in part on the data.

9. The system of claim 8, wherein the threshold is predetermined.

10. The system of claim 8, wherein the meshless modeling technique comprises a weighted curvature minimization criterion.

11. The system of claim 8, wherein modeling the subterranean volume comprises constraining the meshless term of the refined implicit function to zero at a boundary of the sample domain.

12. The system of claim 8, wherein the mesh elements comprise tetrahedra.

13. The system of claim 8, wherein the sample domain is proximal to or includes a discontinuity in the digital model.

14. The system of claim 8, wherein the sample domain is a first sample domain, the operations further comprising:
identifying a second sample domain in the digital model, wherein the second sample domain has a different resolution that the first sample domain; and
determining the refined implicit function for the second sample domain, wherein modeling the subterranean volume comprises using the refined implicit function for the second sample domain.

15. A non-transitory computer-readable medium storing instructions that, when executed by at least one processor of a computing system, cause the system to perform operations, the operations comprising:

receiving data representing a geology of a subterranean volume, wherein the data comprise data derived from seismic sensing equipment;

calculating a mesh for a digital model of the subterranean volume;

generating the digital model using the mesh and the data, wherein generating the digital model comprises defining an implicit function for isostratigraphic surfaces of the subterranean volume;

calculating values for data points in the model using the implicit function, wherein the data points are contained within mesh elements of the mesh;

determining a discrepancy value for one or more of the data points by comparing one or more of the values to one or more expected values corresponding to the one or more of the data points;

identifying a sample domain in the digital model, wherein the sample domain includes at least one mesh element of the mesh elements, the at least one mesh element containing at least one of the one or more of the data points with the discrepancy value associated therewith exceeding a threshold;

determining a refined implicit function for the sample domain, wherein the refined implicit function comprises a term calculated using a mesh-based modeling process and a term calculated using a meshless modeling technique;

modeling the subterranean volume using the refined implicit function for the sample domain and the implicit function for an area outside of the sample domain in the digital model; and based on the modeling, generating a revised digital model, wherein at least one of the isostratigraphic surfaces in the revised digital model is spatially refined using the refined implicit function to represent structure of the subterranean volume based at least in part on the data.

16. The medium of claim 15, wherein the threshold is predetermined.

17. The medium of claim 15, wherein the meshless modeling technique comprises a weighted curvature minimization criterion.

18. The medium of claim 15, wherein modeling the subterranean volume comprises constraining the meshless term of the refined implicit function to zero at a boundary of the sample domain.

19. The medium of claim 15, wherein the mesh elements comprise tetrahedra.

20. The medium of claim 15, wherein the sample domain is proximal to or includes a discontinuity in the digital model.

* * * * *